Oct. 27, 1931.  F. N. SAMSON  1,829,373
VALVE BURNISHING TOOL
Filed May 31, 1929

Witness:
William P. Kilroy

Inventor:
Frank N. Samson
By Hill n Hill
Attys

Patented Oct. 27, 1931

1,829,373

UNITED STATES PATENT OFFICE

FRANK N. SAMSON, OF ELGIN, ILLINOIS

VALVE BURNISHING TOOL

Application filed May 31, 1929. Serial No. 367,273.

My invention relates to burnishing tools operable for finishing valve seats and more particularly it relates to burnishing tools especially adapted for finishing seats for poppet valves, either before or after such seats have been otherwise ground, reamed or abraded.

An object of the invention is to provide a burnishing tool operable to quickly burnish or polish valve seats or the like, such device being adapted either for power drive or for manual manipulation.

The device of my invention is especially adapted for use in garages and repair shops not equipped with a separate grinding device for each type or size of poppet valve.

My invention contemplates the provision of a tool which is suitable for polishing any poppet valve seats of a given inclination, regardless of the diameter of the valve seat or of the valve stem. This result is accomplished by providing a tapering device which rests on the valve seat. In valve seats of relatively small diameter the lower portion of such device operatively contacts with the seat, while in valve seats of larger diameter the upper portion of the device is in operative contact with the seat and does the work. The device is adapted for use with valves having stems and guides of different diameters by interchanging the particular portion of the device which is mounted in the guide for the valve stem and another object of the invention is the provision of a burnishing tool of the kind described adapted for use in burnishing seats for poppet valves of various sizes and various diameters of valve stems.

A further object of the invention is the production of a device of the kind described which is simple in construction, of a small number of parts, easy to manufacture, durable, reliable, and highly satisfactory for its intended purpose.

Many other objects and advantages of the construction herein shown and described will be obvious to those skilled in the art from the disclosure herein given.

To this end, my invention consists in the novel construction, arrangement and combination of parts herein shown and described, and more particularly pointed out in the claims.

Referring now to the drawings forming part of this specification;

Fig. 1 is a sectional elevation of one embodiment of the device illustrated as mounted in a poppet valve seat of an automobile engine or the like;

Figure 1:
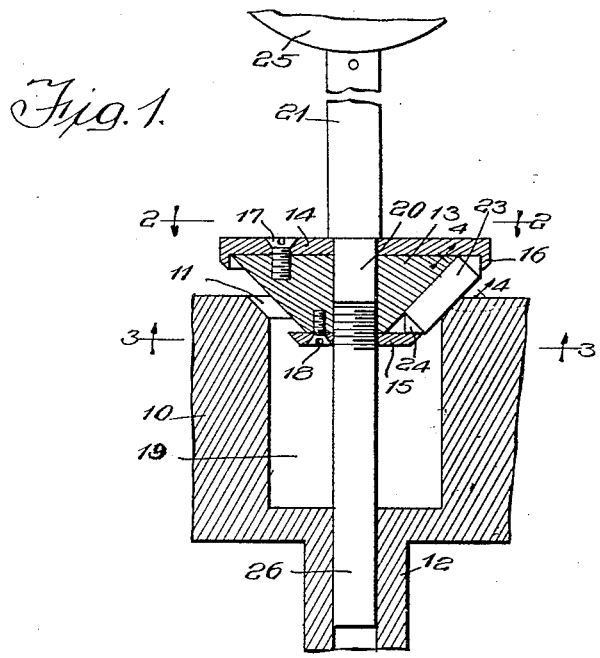
Figure 2:
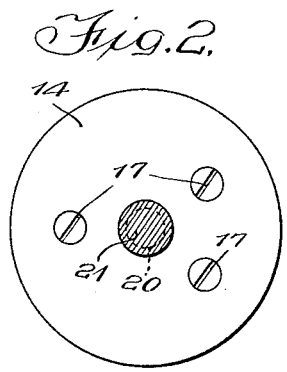
Fig. 2 is a view along the line 2—2 of Fig. 1.
Figure 3:
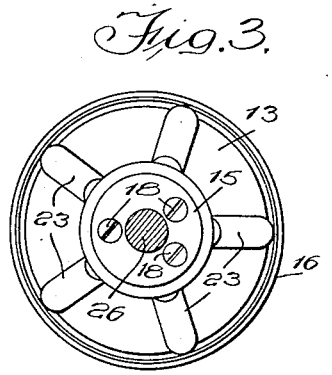
Fig. 3 is a view along the line 3—3 of Fig. 1.
Figure 4:
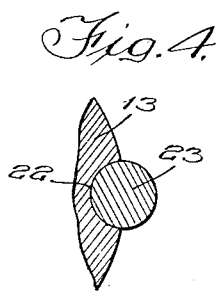
Fig. 4 is a detail sectional view along the line 4—4 of Fig. 1.

Referring now more particularly to the drawings, the numeral 10 generally designates a portion of a gas engine including a valve seat 11, a guide 12 and a port 19 positioned between the seat and the guide.

The main body member of the burnishing tool comprises a tapering disk or frusto conical body 13 having an axial bore 20. The body 13 is provided with an upwardly extending driving shank 21 preferably fixedly mounted in the bore 20. The shank 21 may if desired be integrally formed with the body 13 or may be separately formed and fastened thereto in any other practicable manner. The outer projecting end of the shank 21 is adapted for connection with a chuck or other driving means 25. The driving means 25 may be operated manually or by suitable connection with a rotating shaft.

The burnishing tool is designed while in operation, to be positioned on the seat of the poppet valve with the axis of the tool in exact alignment with the axis of the poppet valve when the valve is in position. For this purpose a guide stem 26 is mounted in the body 13 opposite to the shank 21 and in axial alignment with the body and the shank. The stem 26 is threaded into the bore 20 a substantial distance. The stem 26 is shown as of a uniform diameter through its length and is thereby adapted to closely fit within the valve stem guide 12 so as to maintain the disk, while in operation, in exact axial alignment with the valve which has been removed for the purpose of burnishing its seat 11.

A retaining plate 14 is mounted on the upper face of the disk 13 and fastened thereto by a plurality of screw bolts 17. A lower retaining plate 15 is mounted on the opposite face of the body 13 and fastened thereto by means of a plurality of screw bolts 18. The plate 14 is circular and projects slightly beyond the large end of the tapering body 13. The projecting portion of the plate 14 has a downwardly extending annular shaped flange 16. The plate 15 projects a substantial distance beyond the lower relatively small face of the body 13.

The projecting edges of the plate 14 and 15 together with the flange 16 provide a cage or retaining means for a plurality of rollers 23 rotatably mounted on the tapering face of the body 13. The drawings illustrate five equally spaced rollers 23, but it is obvious that any desired number of such rollers may be provided. A groove 22 is provided in the body 13 for each of the rollers 23, the radius of the grooves and of the rollers being substantially equal so that the rollers may closely fit and rotate in the grooves. The rollers 23 have conical ends 24, the inclination of the ends preferably being such as to cause the ends to contact throughout their length with the adjacent plates 14 and 15 when the rollers are rotated.

The rollers 23 are given the same angle of inclination as the bevelled face of the body 13 on which they are mounted. The body 13 is shown in the drawings as having a 45 degree bevel or taper, that being the angle of inclination of many types of poppet valves and poppet valve seats. It is obvious that the body 13 can be given any other desired angle of inclination corresponding with any particular type of valve and that by increasing the diameter of the tool or by increasing the length of the body and the lengths of the rollers 23 the tool is adapted for use with valve seats covering a considerable range of sizes. The lower portion of the device would have working contact in the case of seats of small diameters and the upper portion would be in contact for valve seates of larger diameters. As is well known to those familiar with the art, there are a great variety of poppet valves and a correspondingly large number of valve stems having different diameters. The manufacturers of poppet valves do not always provide a stem of a standard diameter for the same size of valves and in many instances the diameter of the poppet valve stems and guides for one make of automobile is different from that of other makes. The same tool is adapted for use with different valve stem guides of different diameters making the guide stem 26 removable and interchangeable. For example, if the device is to be used with a guide stem having a smaller bore than that shown, a stem having a smaller diameter, but with its threaded portion the same as that shown, can be provided. If the device is to be used for burnishing or polishing a valve seat having a guide stem bore of larger diameter than that shown, the stem 26 can be replaced with a stem having a diameter adapted to fit the bore and its upper end offset and suitably threaded for mounting in the device as shown.

Thus it will be seen that by making the member 26 detachable and interchangeable and providing a plurality of said members, each having its main body portion of a different outside diameter to correspond to guide stems of different diameters, it is obvious that the tool may be used for polishing valve seats of many different sizes and types. Its adaptability for general use can be further increased by providing a plurality of tools, each having a different inclination corresponding to each separate inclination of poppet valve seats.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. A device of the kind described comprising a frusto conical body having an axial bore, the conical face of said body having a plurality of longitudinal grooves extending substantially its full length, a plurality of cylindrical rollers having conical ends mounted one in each of said grooves, said grooves encircling substantially one half of said rollers, an annular projection on each end of said body against which the corresponding conical ends of the rollers revolve, one of said annular members having a flange which cooperates with said annular projections to prevent longitudinal movement of the rollers, said flange and projection together forming an angular runway closely fitting the adjacent conical faces of the rollers.

2. A device of the kind described comprising a frusto conical body having an axial bore, the conical face of said body having a plurality of longitudinal grooves extending substantially its full length, a plurality of cylindrical rollers having conical ends mounted one in each of said grooves, said grooves encircling substantially one half of said rollers, circular plates forming an annular projection at each end of the body against which the corresponding conical ends of the rollers revolve, the plate on the large end of said body having a flange which cooperates with said annular projections to prevent longitudinal movement of the rollers, said flange and plate forming an angular runway closely fitting the adjacent ends of the rollers.

3. A device of the kind described comprising a frusto conical body having an axial bore, a driving shank mounted in said bore and projecting from the large end of said body and a guide stem mounted in and projecting from the opposite end of said bore, the conical face of said body having a plurality of longitudinal grooves extending substantially its full length, a plurality of cylindrical rollers having conical ends mounted one in each of said grooves, said grooves encircling substantially one half of said rollers, an annular projection on each end of said body against which the corresponding conical ends of the rollers revolve, one of said annular projections having a flange which cooperates with said annular projections to prevent longitudinal movement of the rollers, said flange and member together forming an angular runway closely fitting the adjacent conical faces of the rollers.

4. A device of the kind described comprising a frusto conical body having an axial bore, a driving shank mounted in said bore and projecting from the large end of said body and a guide stem mounted in and projecting from the opposite end of said bore, the conical face of said body having a plurality of longitudinal grooves extending substantially its full length, a plurality of cylindrical rollers having conical ends mounted one in each of said grooves, said grooves encircling substantially one half of said rollers, circular plates forming an annular projection at each end of the body against which the corresponding conical ends of the rollers revolve, the plate on the large end of said body having a flange which cooperates with said annular projections to prevent longitudinal movement of the rollers, said flange and plate forming an angular runway closely fitting the adjacent conical faces of the rollers.

In witness whereof, I hereunto subscribe my name this 27th day of May, A. D. 1929.

FRANK N. SAMSON.